(12) United States Patent
Torardi

(10) Patent No.: US 6,838,023 B2
(45) Date of Patent: Jan. 4, 2005

(54) TRIVANADIUM OXIDE HYDRATE COMPOSITIONS

(75) Inventor: Carmine Torardi, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 190 days.

(21) Appl. No.: 10/343,281

(22) PCT Filed: Aug. 3, 2001

(86) PCT No.: PCT/US01/24295

§ 371 (c)(1),
(2), (4) Date: Jan. 28, 2003

(87) PCT Pub. No.: WO02/13291

PCT Pub. Date: Feb. 14, 2002

(65) Prior Publication Data

US 2004/0005500 A1 Jan. 8, 2004

Related U.S. Application Data

(60) Provisional application No. 60/223,039, filed on Aug. 4, 2000.

(51) Int. Cl.$^7$ .............................. H01B 1/08; H01M 4/00; H01M 4/58; C01G 31/00
(52) U.S. Cl. ............................... 252/520.4; 252/521.5; 429/231.4; 429/231.5; 423/464
(58) Field of Search .......................... 252/520.4, 521.5; 429/231.4, 231.5; 423/464

(56) References Cited

U.S. PATENT DOCUMENTS 5,336,572 A    8/1994   Koksbang 6,025,092 A    2/2000   Doyle et al.

FOREIGN PATENT DOCUMENTS

WO    WO 99/30378    6/1999
WO    WO 99/45048    9/1999

OTHER PUBLICATIONS

Torardi et al "New Battery Cathode Materials; Synthesis, Characterization, and Electrochemical Performance of M1–xV3O8–yFz–nH2O", Chemistry of Materials (2002), 14(10), 4430–4433. Abstract Only.*

Koksharov et al "Electrode Properties of the potassium vanadium oxyfluoride bronze K0.23V2O4.77F0.23", Inorganic Materials (1998), 34(1), 58–59. Abstract Only.*

E. Andrukaitis, et al. "Vanadium Pentoxide Electrodes. I. Formation of Vanadium Pentoxide from Anodic Electrodeposits", Solid State Ionis, (1988), pp. 19–30, North–Holland, Amsterdam.

Novak, et al., "Magnesium insertion batteries—an alternative to lithium", Journal of Power Sources, (1995), pp. 479–482, vol. 54, Switzerland.

Koryakova, et al., "The phase transformations of hydrated potassium hexa–and pentavanadates in the temperature range 200–570 C.", Russian Journal of Inorganic Chemistry, (1989), pp. 675–678, vol. 34, Issue 5.

Novak, et al., "Electrochemical Insertion of Magnesium into Hydrated Vanadium Bronzes", J. Electrochem. Soc., (Aug. 1995) pp. 2544–2550, vol. 142, No. 8, The Electrochemical Society, Inc., Switzerland.

(List continued on next page.)

*Primary Examiner*—Mark Kopec

(57) ABSTRACT

Disclosed is a new vanadium oxide hydrate composition suitable for use as electrode-active material in primary and secondary lithium and lithium ion batteries and a process for its preparation.

21 Claims, 3 Drawing Sheets

OTHER PUBLICATIONS

Lampe–Onnerud, et al., "Mechanisms for the Thermal Decomposition of NH4VO3 into V6O13, V3O7 and V2O5", (1995), pp. 1075–1080, vol. 5, Issue 7, J. Mater Chem., Uppsala, Sweden.

E. Andrukaitis, et al., "Lithium Insertion Into Oriented Microcrystals and Gels of Anhydrous and Hydrated Vanadium Pentoxide", (1989), pp. 475–482, vol. 26, Journal of Power Sources, London.

Ulicke, et al., "Thermal Properties of Ammonium and Potassium Hydrogethexavahadates" (1965), pp. 451–484, vol. 92, Pratislava, Czechoslovakia.

Bhlazej, et al., "Influcence of temperature, vanadium concentration, and degree of solution acidification o on composition of the solid products", Chemical Papers (1987), pp. 195–202, vol. 41, Issue 2.

* cited by examiner

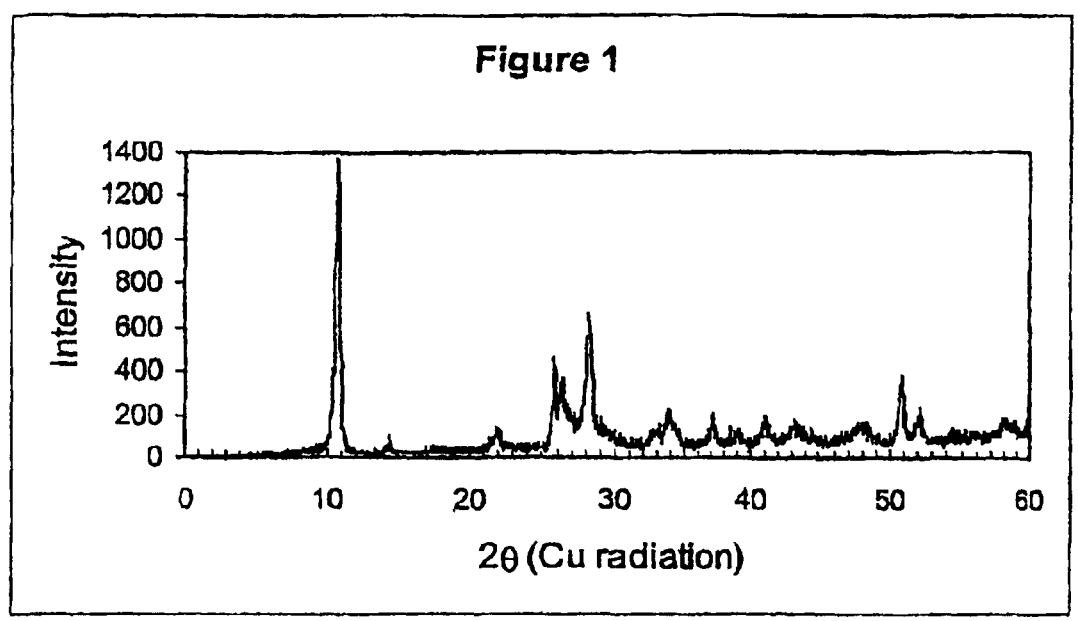

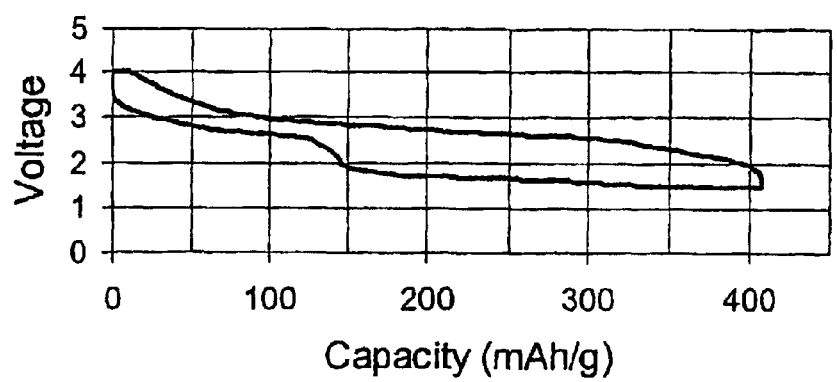
Figure 2. "NH4V3O8·nH2O"

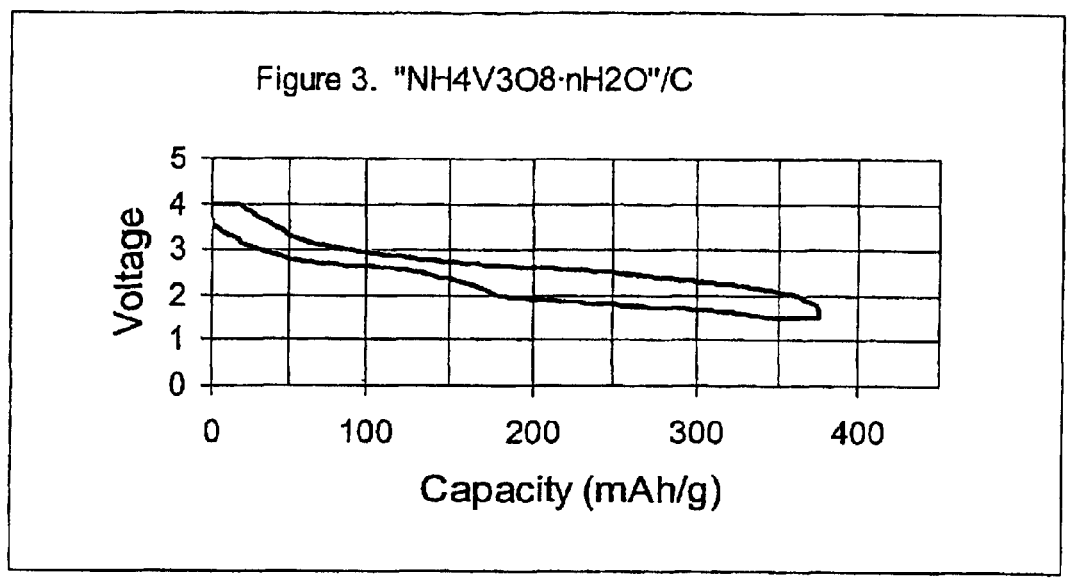

TRIVANADIUM OXIDE HYDRATE COMPOSITIONS

This application claims the benefit of Provisional Application No. 60/223,030, filed Aug. 4, 2000.

FIELD OF THE INVENTION

This invention pertains to new vanadium oxide hydrate compositions highly suitable for use as electrode-active materials in primary and secondary lithium and lithium ion batteries, and processes for their preparation.

TECHNICAL BACKGROUND

Lampe-Oennerud et al., *J. Mater. Chem.* (1995), 5(7), 1075–80 discloses the formation of $NH_4V_3O_8.H_2O$ as an intermediate formed in the thermal decomposition of $NH_4VO_3$. The $NH_4V_3O_8.H_2O$ produced thereby is characterized by an x-ray powder diffraction pattern which is very similar to that published in the standard tables (International Centre for Diffraction Data, JCPDS-ICCD No. 79–2051) for anhydrous $(NH_4)_2V_6O_{16}$. No mention is made of applications to batteries or of ion insertion capacity.

Andrukaitis et al., Solid State Ionics (1988), 27(1–2), 19–30, discloses electrodes composed of hydrated $NH_4V_3O_8$ prepd. by electrochemical formation on various conducting anode substrates. The mechanism of formation involves formation of a sol in a pH gradient at the anode, and subsequent electrophoretic deposition of the sol as an oriented crystalline deposit. The hydrated ammonium trivanadate so prepared is characterized by an x-ray powder diffraction (XPD) pattern similar to that of anhydrous $(NH_4)_2V_6O_{16}$. Very low Li-insertion capacity is observed in their hydrated material, $Li_{0.6}NH_4V_3O_8.H_2O$. In fact, these authors explicitly teach away from employing $NH_4^+$ and $H_2O$(p. 26) in lithium intercalation compounds.

Novak et al., *J. Electrochem. Soc.* (1995), 142(8), 2544–50, discloses $Mg^{2+}$ insertion into layered vanadium bronzes. $MeV_3O_8(H_2O)_y$ (Me=Li, Na, K, $Ca_{0.5}$, and $Mg_{0.5}$) compositions were studied with regard to their use as cathodes of magnesium-ion transfer batteries. In acetonitrile-based electrolytes, max. specific charges of .apprx. 200 A-h/kg were measured but the charge decreases rapidly with increasing cycle number. Variations in the content of bound lattice water in the bronzes are responsible for a difference in the electrochem. properties of the same starting material dried at different temps. The presence of this water seems to be essential. The XPD of a $NaV_3O_8$ hydrate is disclosed. $NH_4$ is not included in the list of suitable cations.

In Novak et al., *J. Power Sources* (1995), 54(2), 479–82, $Li^+$, $Na^+$ and $Mg^{2+}$ insertion in five hydrated, layered, vanadium bronzes, $LiV_3O_8$, $NaV_3O_8$, $KV_3O_8$, $Mg(V_3O_8)_2$ and $Ca(V_3O_8)_2$, was studied with regard to their use as electroactive materials in ion-transfer batteries. The behavior of all bronzes is similar: variation in the content of bound lattice water in the bronzes is responsible for a difference in the electrochem. properties of the same material dried at different temperatures. The presence of this water is essential; the amount of $H_2O$ in the $NaV_3O_8.(H_2O)_y$ and $Mg(V_3O_8)_2.(H_2O)_y$ bronzes has been optimized to get the best electrochemical performance. The specific charges of both optimized bronzes calculated from the first discharge are about 330 and 150 mAh/g for $Li^+$ and $Mg^{2+}$ insertion, respectively. Novak et al. is silent with regard to the ammonium cation.

Andrukaitis et al., *J. Power Sources* (1989), 26(3–4), 475–82, discloses pure crystalline orthorhombic $V_2O_5$ for use as intercalation cathode prepd. by electrolytic deposition from $(NH_4)_2V_6O_{16}.H_2O$. Intercalation of Li by the cryst. $V_2O_5$ occurred in 3 stages detd. by interlayer lattice spacing and available coordination sites. $H_2O$ or $NH_4^+$ impurities occupied interlayer sites and blocked $Li^+$ insertion. $NH_4^+$ and $H_2O$ are said to be unsuitable for lithium insertion.

Ulicka et al., *Thermochimica Acta* (1985), 92, 481–484, discloses $NH_4HV_6O_{16}.3H_2O$ and $KHV_6O_{16}.3H_2O$. Studies by thermal analysis, IR spectroscopy and x-ray show that the loss of 3 $H_2O$ molecules did not change the original arrangement of V and O atoms in the anion. Only after the loss of constitutional water the compounds decomposed and other oxovanadates were formed.

Ulicka, *Chem. Pap.* (1987), 41(2), 195–202, discloses the effect of temperature, vanadium concentration, acidity of reaction solution, and reaction time on the composition of the products obtained from a $KVO_3$—$HNO_3$—$H_2O$ system. Among the products are $KHV_6O_{16}.3H_2O$ and $K_2V_6O_{16}.2H_2O$ formed. The degree of acidity of soln. has the most significant effect on composition of the products obtained from solutions at 40–80° C. At 22° C., the reaction time also becomes significant. The purity of the prepared $K_2V_6O_{16}.2H_2O$ was verified by differential thermal analysis, and an XPD pattern is provided. The process of Ulicka uses $HNO_3$ as the acid and takes 21 days to make the product at high yield and purity. They do not talk about an ammonium equivalent.

Di Pasquale et al., *Rass. Chim.* (1984), 36(2), 87–91, disclose $NH_4V_3O_8.0.5\ H_2O$ as a starting material for the preparation of $V_2O_5$. The XPD pattern of their material matches that of anhydrous $(NH_4)_2V_6O_{16}$ in the standard tables, op.cit.

Koryakova et al., *Zh. Neorg. Khim.* (1989), 34(5), 1199–203, disclose $K_2V_6O_{16-y}.3.5H_2O$ and $KV_5O_{13-y}\ 2H_2O$ prepared by precipitation at pH <4. This paper does not discuss the ammonium compound nor is there any discussion about lithium insertion capacity or batteries.

SUMMARY OF THE INVENTION

The present invention provides for a composition comprising a hydrated vanadate salt represented by the formula $M_{(1-x)}V_3O_{8-y}F_z.nH_2O$ where M is $NH_4^+$ or $K^+$; $0 \leq x < 0.5$, $0 < y < 0.5$, $0 < z < 0.5$, and $0 \leq n < 2$.

The present invention also provides for a process for producing a hydrated vanadate salt represented by the formula $M_{(1-x)}V_3O_{8-y}F_z.nH_2O$ where M is $NH_4^+$ or $K^+$; $0 \leq x < 0.5$, $0 < y < 0.5$, $0 < z < 0.5$, and $0 \leq n < 2$, the process comprising combining a water-soluble vanadate salt with water to form a solution; and, adding to said solution hydrofluoric acid such that the molar ratio of acid protons to vanadium is in the range of 0.5:1 to 3:1.

Additionally, the present invention provides for an electrochemical electrode comprising $M_{(1-x)}V_3O_{8-y}\ F_z.nH_2O$ wherein M is $NH_4^+$ or $K^+$; $0 \leq x < 0.5$ $0 < y < 0.5$, $0 < z < 0.5$, and $0 \leq n < 2$ Finally provided is an electrochemical cell comprising an electrode comprising the composition of the invention.

BRIEF DESCRIPTION OF THE FIGURES

FIG. 1 is a typical XPD pattern of an ammonium composition of the present invention. This result is derived from the composition exemplified in Example 6.

FIG. 2 shows the percent of useable capacity that can be restored by re-charging. This result is derived from the coin cell produced in Example 6.

FIG. 3 shows the results obtained from precipitating $(NH_4)_{(1-x)}V_3O_{8-y}F_z \cdot nH_2O$ onto carbon compared to a corresponding composition not precipitated onto carbon. The comparison in FIG. 3 derives from the coin cell produced in Example 7.

DETAILED DESCRIPTION

The present invention is directed to a composition and process for forming a composition represented by the formula $M_{(1-x)}V_3O_{8-y}F_z \cdot nH_2O$, wherein $M=NH_4^+$ or $K^+$, $0 \leq x < 0.5$, $0 < y < 0.5$, $0 < z < 0.5$, and $0 \leq n < 2$, which is highly suitable for use as an electrode-active material in batteries, particularly lithium and lithium ion primary and secondary batteries, and to the compositions, electrodes, and electrochemical cells formed therewith. One of skill in the art will understand that the composition of the invention may be variously represented by compositional ratios which are equal multiples of some common factor. All such compositions are encompassed in the present invention. For the purpose of the present invention, the composition of the invention will always be referred to as $M_{(1-x)}V_3O_{8-y}F_z \cdot nH_2O$.

Preferably, M is $NH_4^+$, $0 \leq x \leq 0.3$, $0 < y < 0.3$, $0 < z < 0.3$, and $0 \leq n \leq 1$. Most preferably, n is as close to zero as possible while retaining the unique structure and benefits of the present invention, and $x=0$.

In the process of the invention, a water soluble vanadate salt is dissolved in water preferably accompanied by heating, followed by addition of HF and precipitation at high yield of the desired $M_{(1-x)}V_3O_{8-y}F_z \cdot nH_2O$ product.

The $M_{(1-x)}V_3O_{8-y}F_z \cdot nH_2O$ produced according to the process of the invention exhibits some surprising attributes. One such attribute is an X-ray powder diffraction pattern, XPD, characterized by at least one peak, preferably two peaks, in the range of $25.5° < 2\theta < 27.0°$ when copper is the source of the x-radiation. A typical XPD pattern of the preferred ammonium composition of the present invention is shown in FIG. 1, which derives from the composition exemplified in Example 6 hereinbelow. The XPD pattern of the product of the present invention is quite different from that reported for other forms of ammonium vanadium oxide compositions.

In a further surprising aspect, when incorporated as an electrode active material into an electrochemical cell or battery, preferably a lithium or lithium ion secondary battery the $M_{(1-x)}V_3O_{8-y}F_z \cdot nH_2O$ of the present invention provides a high initial discharge capacity with a very high reversible fraction.

It is further found in the practice of the invention that the initial discharge capacity depends upon the cation of the vanadium salt employed in the process of the invention. A surprisingly high initial discharge capacity is achieved when the preferred $(NH_4)_{(1-x)}V_3O_{8-y}F_z \cdot nH_2O$ is employed. The preferred $(NH_4)_{(1-x)}V_3O_{8-y}F_z \cdot nH_2O$ of the invention also imparts a high degree of reversibility to the standard lithium test cell described herein. As much as 99% percent of useable capacity can be restored by re-charging as shown, for example in FIG. 2 which derives from the coin cell produced in Example 6 hereinbelow.

It is further found in the practice of the invention that when the preferred $(NH_4)_{(1-x)}V_3O_{8-y}F_z \cdot nH_2O$ composition of the invention is precipitated onto carbon according to the process hereinbelow described, the electrode formed therefrom imparts a higher degree of reversibility than a corresponding composition not precipitated on carbon. This is shown in FIG. 3 which derives from the coin cell produced in Example 7 hereinbelow.

For the purpose of the present invention, initial discharge capacity is determined according to the methods hereinbelow described here and summarized: the $M_{(1-x)}V_3O_{8-y}F_z \cdot nH_2O$ of the invention is combined with carbon black and a binder resin to form an electrode sheet. The electrode so-formed is combined in a standard lithium metal coin cell configuration. The coin cell so formed is initially in the charged state at somewhat less than 4 volts. The cell is then subject to discharging and over the range from 4 volts down to 1.5 volts, voltage (V) and current (I) are measured as a function of time. The measurement of initial discharge capacity begins with a constant current discharge at 0.5 ma until the voltage reaches 1.5 volts. At 1.5 volts, the discharge mode is changed to constant voltage wherein the voltage is held constant while the current slowly decays to $\frac{1}{10}^{th}$ the original value, i.e., 0.05 ma. This constant voltage portion of the discharge, which allows the cell to nearly reach equilibrium, has the effect of reducing the potential drops from the current so that the remaining cell polarization is principally due to the over potential required for lithium insertion into the cathode material. The initial discharge capacity is the integrated charge transfer during both the constant current and constant voltage portion of the discharge. For performing these measurements, it has been found suitable to employ a Maccor series 4000 tester (Maccor, Inc., Tulsa, Okla.) using channels with a 10 ma maximum current capability and Version 3.0 (SP1) software.

In the process of the invention, it is preferred to run the process below the boiling point.

In the process of the invention, water, preferably deionized water, is combined with a vanadate salt and the mixture so formed is preferably heated, preferably with agitation, to a temperature in the range of 70° C. up to and including the boiling point of the mixture to form a solution having a vanadium concentration in the range of 0.01–3 M, preferably 0.1–1 M. Suitable vanadate salts include ammonium and potassium vanadates such as $NH_4VO_3$ and $KVO_3$. Preferred is $NH_4VO_3$. In the alternative, $V_2O_5$ can be combined with aqueous ammonium or potassium hydroxide in stoichiometric or nonstoichiometric quantities to form in situ the corresponding vanadate solution. Preferably, the solution is heated above room temperature. A temperature of 65–75° C. has been found to be satisfactory. In the case of the potassium salt, the solution is more preferably heated to boiling.

While heating is preferably continued, hydrofluoric acid (HF) is added to the solution in sufficient quantity to provide an acid proton to vanadium ratio (H/V ratio) in the range of about 1.5:1 to 3:1. An H/V ratio of about 0.5:1 to 1.5:1 can also be employed; however, the temperature of the solution must be adjusted to about room temperature or below. In the H/V ratio range of 0.5:1 to 1.5:1, and at room temperature, reduced yield and longer reaction time may result. HF may be incorporated in concentrated form such as 29 M, but for safety it is preferred to employ diluted HF. 8–15 M HF has been found to be satisfactory. More dilute solutions may also be employed; however, the volume of solution may be quite large on the one hand and the reaction time may become longer. After acid addition in the H/V ratio range of 1.5:1 to 3:1, heating is preferably continued while the solution is mixed for at least 1 minute but preferably 4–24 hours or more.

The resulting $M_{(1-x)}V_3O_{8-y}F_z \cdot nH_2O$ precipitate may be recovered by any convenient method, including settling followed by decanting the supernatant liquid, filtration, centrifugation, and other methods known in the art. The precipitate is characterized by an XPD pattern, as shown in FIG. 1 for M=NH$_4$, exhibiting at least one peak in the range of 25.5°≦2θ≦27° when Cu x-radiation is employed.

The dissolution of the vanadate salt in the water may be accomplished in most cases at any convenient temperature including room temperature, but it is found in the practice of the invention that the rate of dissolution is quite slow at room temperature, and is greatly increased by heating, particularly to a temperature at or near the boiling point. At temperatures below the boiling point, dissolution is considerably enhanced by agitation.

Precipitation of the M$_{(1-x)}$V$_3$O$_{8-y}$F$_z$.nH$_2$O of the invention by HF addition to the vanadate salt solution may be accomplished at any convenient temperature including room temperature. However, it is found in the practice of the invention that it is highly desirable to effect the reaction at elevated temperature, particular at 65–75° C. for M=NH$_4^+$ and at the boiling point of the solution for M=K$^+$ when the H/V ratio is in the range of 1.5:1 to 3:1. It is also found in the practice of the invention that it is desirable to effect the reaction at or below room temperature when the H/V ratio is in the range of 0.5:1 to 1.5:1. It is found in the practice of the invention that reduced yield is likely to result when the time of reaction is below about 4 hours.

The percentage of the dissolved vanadium precipitated, which largely determines the single pass product yield, is largely determined by the H/V ratio, reaction time, and temperature. The highest yield of clean product is achieved in the minimum amount of time at about 70° C., and at H/V ratios of about 1.5:1 to 3:1. Lower yields of clean product are obtained with longer reaction times at or below room temperature when the H/V ratio is about 0.5:1 to 1.5:1. In the H/V ratio range of about 0.5:1 to 1.5:1, and at temperatures at or above room temperature, the product can be contaminated with anhydrous (NH$_4$)$_2$V$_6$O$_{16}$. For example, at H/V= 1:1, and at the boiling temperature, the product is mainly (NH$_4$)$_2$V$_6$O$_{16}$ at ~75–80% yield. The same reaction performed at room temperature produces only the composition of the invention. Therefore, as the H/V ratio is lowered from 3:1 to 0.5:1, so also is the optimum reaction temperature lowered, from about 70° C. to room temperature or below, in order to minimize or avoid formation of (NH$_4$)$_2$V$_6$O$_{16}$ impurity, and, in so doing, achieve a clean product. Outside this H/V range, the product yield drops quickly and impurities may be produced. At H/V ratios below about 0.5:1, the product is contaminated with anhydrous (NH$_4$)$_2$V$_6$O$_{16}$. At the high limit of 3:1, in addition to the composition of the invention, there is some (NH$_4$)$_2$V$_6$O$_{16}$ and amorphous material produced at the boiling temperature. At 4:1, no solid formed after boiling for 1 hour, and after cooling for 2 hours, a very small amount of V$_2$O$_5$.H$_2$O was obtained. It has been further found that when the H/V ratio in the process described herein is 5, V$_2$O$_5$.H$_2$O is formed at considerably higher yield than at H/V of about 4. The V$_2$O$_5$.H$_2$O so formed has been found to exhibit a lithium ion capacity of about 375 mAh/g.

The temperature of reaction is also important. It is found in the process of the invention that the preferred ammonium composition is generally contaminated when the process is conducted at the boiling point, which is therefore less preferred. In the preferred embodiment of the process of the invention, the reaction to form the preferred ammonium composition is most preferably conducted below the boiling point to attain a high yield of pure product. A temperature of 65–75° C. has been found to be satisfactory when the HI/V ratio is in the range of about 1.5:1 to 3:1, and, a temperature of about room temperature or below has been found to be satisfactory when the H/V ratio is in the range of about 0.5:1 to 1.5:1. However, in the case of the less preferred potassium composition of the invention, highly pure product is obtained when the reaction is conducted at the boiling point. Yield has been observed to increase with reaction time, a particularly important parameter when the reaction is run below the boiling point. At 70° C., the yield after 6 hrs of heating was 64%, and after an additional 3 hrs at room temperature, the total yield was 76%.

Though not strictly necessary, it is highly preferred that the recovered solid, however collected, be re-slurried with fresh water to remove contaminants, followed by once again recovering the solid. The number of washing steps required to achieve the desired level of purity will depend upon the solubility of the impurities, the amount of water employed, the desired level of purity, and the efficiency of the slurrying process. It has been found in the practice of the invention that for many purposes it is sufficient to discontinue washing when the pH of the supernatant liquid reaches about pH=3 or higher.

The recovered solid is then dried by any convenient means including but not limited to radiative warming and oven heating. Following drying, pulverization, and sieving, the M$_{(1-x)}$V$_3$O$_{8-y}$F$_z$.nH$_2$O so produced is ready for incorporation into an electrode composition. In a preferred embodiment, M is NH$_4^+$ and the lithium cell formed exhibits a surprisingly high initial discharge capacity. Drying at ca. 80–100° C. removes excess wash water. It is found, however, that drying at ca. 200° C. is effective at removing compositional water with the result that the value of "n" is reduced below that in the as synthesized composition. While the effect of compositional water (i.e., n>0) on lithium intercalation is expected to be small, water in the structure may react with Li irreversibly if, during use, the operating voltage is reduced to 1.5 volts, thereby resulting in a loss of reversible capacity. Operation at 2.0 volts with water in the structure is not expected to result in a problem.

One of skill in the art will appreciate that the precise values of x, y, z, and n will be determined according to specific temperatures, concentrations, and reaction times as well as various post-treatment steps. The specific values and range of values acceptable for a given specific application can be readily arrived at by simple experimentation controlling and varying the process parameters herein described.

In one preferred embodiment of the process of the invention, elemental carbon, for example carbon black, is slurried into the vanadium salt solution prior to the addition of the hydrofluoric acid. In the practice of the invention, the carbon black may be added to the water before the vanadium salt is dissolved therein, simultaneously with the dissolution of the vanadium salt, or after the dissolution of the vanadium salt. In one embodiment, the carbon black is first slurried separately in aqueous dispersion, and the resulting slurry is added to the heated vanadate solution The resulting precipitation product after acid addition in the manner hereinabove described is a finely dispersed powder of carbon black coated with the preferred (NH$_4$)$_{(1-x)}$V$_3$O$_{8-y}$F$_z$.nH$_2$O of the invention which is highly preferred for use in secondary or rechargeable lithium batteries. The thus prepared coated carbon combines the high initial discharge capacity characteristic of the (NH$_4$)$_{(1-x)}$V$_3$O$_{8-y}$F$_z$.nH$_2$O, with low polarization and high vanadium utility or energy efficiency. The amount of carbon black found suitable for the practice of the invention is of an amount ranging from 1–12%, preferably 4–8%, by weight based upon the weight of the total weight of the final isolated carbon(NH$_4$)$_{(1-x)}$V$_3$O$_{8-y}$F$_z$.nH$_2$O dried powder.

Any form of finely dispersed elemental carbon is suitable for the practice of the invention. Super P carbon black, commercially available from MMM S.A. Carbon, Brussels, Belgium, is one such suitable elemental carbon which has a surface area of about 62 m²/g. While no particular limitations on surface area have been determined for the carbon black suitable for use in the present invention, higher surface areas may be preferred over lower surface areas.

The process of the invention may be performed in both batch and continuous modes. A continuous process, with a recycle stream of unprecipitated vanadate salt, is particularly desirable when the reaction is run under relatively low-yield conditions.

It is well known in the art of electrochemical cell fabrication to form an electrode composition by combining an electrode-active material, such as the preferred $(NH_4)_{(1-x)}V_3O_{8-y}F_z \cdot nH_2O$ of the invention, with carbon black and a binder resin to provide improved electronic conductivity as well as superior physical integrity to the electrode composition. Suitable binder resins include EPDM rubber, polyvinylidene fluoride and its copolymers for example with hexafluoropropylene as well as other resins such as are known in the art as suitable for the purpose. Also suitable are ionomer resins such as copolymers comprising monomer units of vinylidene fluoride and sulfonate, imide, or methide ionic monomers such as those disclosed in Doyle et al., U.S. Pat. No. 6,025,092 and Feiring et al., WO 9945048. Binder resins are normally first dissolved in fugitive solvents before combining with the other ingredients of the electrode. Suitable solvents are well known in the art and include acetone, cyclohexane, and cyclopentanone, among others. Not all binders suitable for the practice of the invention required dissolution in a solvent. Preferred binders are copolymers of polyvinylidene fluoride and hexafluoropropylene, and ionomers comprising polyvinylidene fluoride monomer units.

It is found in the practice of the invention that the electrode composition of the invention comprising elemental carbon coated with $(NH_4)_{(1-x)}V_3O_{8-y}F_z \cdot nH_2O$ exhibits a benefit over a similar electrode composition comprising $(NH_4)_{(1-x)}V_3O_{8-y}F_z \cdot nH_2O$ of the invention when the $(NH_4)_{(1-x)}V_3O_{8-y}F_z \cdot nH_2O$ is not coated onto elemental carbon. This benefit is a reduced polarization on charge/discharge cycles.

The process of the invention for producing $(NH_4)_{(1-x)}V_3O_{8-y}F_z \cdot nH_2O$ coated carbon may also be employed to add or dope in other elements. For example, if prior to precipitation of $(NH_4)_{(1-x)}V_3O_{8-y}F_z \cdot nH_2O$ by HF addition, one adds a transition metal or metal compound, a chemically modified precipitated product is obtained after acid addition.

The electrode composition so formed may then be employed in an electrochemical cell. A preferred use for the electrode composition of the invention is in secondary lithium or lithium ion batteries. Such batteries comprise an anode of lithium metal or a lithium alloy, an ion-conducting separator, and a cathode of the composition of the invention, as well as such other components as are necessary or desirable for the preparation of a useful battery and as are well-known in the art.

A lithium-ion battery is assembled in the charged state by either using an anode material which contains already the appropriate cyclable lithium or some fraction thereof. This may be achieved as is known in the art, for example, by using lithium metal, or, contacting lithium metal or some other lithium source with a carbon-based anode material during cell assembly which will allow the necessary cyclable lithium to be accomodated in the carbon structure. Another means for using the claimed materials in lithium-ion cells would involve intentional prelithiation of the $M_{(1-x)}V_3O_{8-y}F_z \cdot nH_2O$, for example by either chemical means or electrochemical means. This would increase the lithium content in the claimed materials to desirably higher levels for use in lithium-ion batteries with initially discharged anodes.

COMPARATIVE EXAMPLE 1

20.1 g $NH_4VO_3$ were added to about 850 ml deionized $H_2O$ while stirring with a Teflon coated magnetic stirring bar in a 1-liter Pyrex beaker. The contents of the beaker were heated to the boiling point to form a solution. 6 ml of concentrated HF was diluted with 15 ml $H_2O$ with stirring, and was added to the boiling solution. The pH of the mixture, measured with multi-color strip pH paper, was about 4. The reaction was continued at the boil while stirring for 1 hour. The H/V ratio was 1/1.

The beaker was then removed from the heat and stirring continued at room temperature for 3 hours. Solids were allowed to settle and the supernatant liquid was decanted. The decanted supernatant liquid was deep yellow in color indicating the presence of unprecipitated vanadium. The pH of the supernatant liquid, measured with multi-color strip pH paper, was about 4. The solid was collected on filter paper by suction filtration and washed twice with 50-ml portions of deionized water. The filter cake was broken up into pieces on a large cover glass and dried under an IR heat lamp for 4 hours. An X-ray powder diffraction pattern showed the product to be the undesired material $(NH_4)_2V_6O_{16}$.

EXAMPLE 1

20.1 g $NH_4VO_3$ were added to about 900 ml deionized $H_2O$ while stirring with a Teflon coated magnetic stirring bar in a 1-liter Pyrex beaker. The contents of the beaker were heated to the boiling point to form a solution. After cooling the solution to room temperature, 6 ml of concentrated HF, diluted with 30 ml $H_2O$, were added to the solution. The pH of the solution, measured with multi-color strip pH paper, was about 4. The reaction was stirred at room temperature for 64 hours. The H/V ratio was 1/1.

Solids were collected on filter paper by suction filtration and washed twice with 250-ml portions of deionized water. The original filtrate liquid was deep yellow in color indicating the presence of unprecipitated vanadium. The filter cake was broken up into pieces and dried under an IR heat lamp for 2 hours to give 1.8 grams of material. An X-ray powder diffraction pattern of the product was essentially the same as that shown in FIG. 1, and, showed two peaks in the range $25.5° \leq 2\theta \leq 27°$ associated with $NH_{4(1-x)}V_3O_{8-y}F_z \cdot nH_2O$. The product was free of $(NH_4)_2V_6O_{16}$ impurity.

An additional 1.0 g of solid was formed from the original filtrate liquid after stirring for 3 days at room temperature. An XPD pattern showed the solid to also be $NH_{4(1-x)}V_3O_{8-y}F_z \cdot nH_2O$ and free of $(NH_4)_2V_6O_{16}$ impurity.

After grinding a portion of the 1.8 gram batch to produce a powder, the powder was sieved through a 200-mesh screen to get powder suitable for making a cathode. To make the electrode, 1.4998 g of the powder were combined with 0.1367 g of Super P carbon black commercially available from MMM S.A. Carbon, Brussels, Belgium, and 1.709 g of a 4 wt % solution of EPDM rubber in cyclohexane. 4 ml extra cyclohexane were added to improve flow. The mixture was shaken in a capped glass vial for 15 minutes on a mechanical shaker to form a cathode paste.

The cathode paste was spread onto a sheet of Teflon® FEP (E. I. du Pont de Nemours and Company, Wilmington, Del.)

and drawn down to form a film using a doctor blade having a 15 mil gap. The dried film, consisting of 88% by weight powder, 4% by weight binder, and 8% by weight carbon black, was hot-pressed through a calender roller between Kapton® polyimide sheets (DuPont) at 2000 psi and 110° C. to form a consolidated electrode sheet suitable for use as a cathode in a lithium battery. The thickness of the sheet was 125 micrometers.

The resultant consolidated electrode sheet was employed as a cathode against a Li metal anode in an electrochemical cell. $LiPF_6$ in EC/DMC (ethylene carbonate/dimethyl carbonate) served as the electrolyte solution. A glass fiber separator was used between the electrodes. Disks of cathode, anode, and separator were cut with punches. In a dry helium atmosphere, the cathode and separator pieces were soaked in electrolyte solution, then stacked along with the Li into a coin-cell pan and sealed under pressure using the 2325 Coin Cell Crimper System manufactured by the National Research Council of Canada. The coin cell was tested as described above and the initial discharge capacity was determined to be 403 mAh/g.

EXAMPLE 2

20.1 g $NH_4VO_3$ were added to about 850 ml deionized $H_2O$ and treated as in Comparative Example 1, except that 9 ml of concentrated HF in 30 ml deionized water were added to the boiling solution. The H/V ratio was 1.5/1.

After 1 hour, the beaker was removed from the heat and stirring discontinued. The solids settled quickly and were allowed to settle for 5 minutes. About 800 ml of supernatant liquid were decanted. The pH of the supernatant liquid, measured with multi-color strip pH paper, was about 3–4. The decanted supernatant liquid was pale yellow in color indicating the presence of some unprecipitated vanadium. About 1000 ml of fresh $H_2O$ were added to the precipitate in the beaker, which was then slurried with the water by stirring for about one minute. The pH of the supernatant wash liquid was about 4. The product was easily and quickly collected on filter paper by suction filtration. The moist cake was crumbled onto a large cover glass, dried in air overnight, and under an IR heat lamp for 4 hours to give 11.0 grams of material. An X-ray powder diffraction pattern showed the lines normally associated with $(NH_4)_2V_6O_{16}$, and two peaks in the range $25.5°<2\theta<27°$ associated with $NH_{4(1-x)}V_3O_{8-y}F_z.nH_2O$ as well as other peaks belonging to this composition as represented in FIG. 1. On the basis of the latter composition with x=y=z=0.1 and n=0.9, representing a typical composition obtained by thermogravimetric and chemical analyses presented in Examples 6 and 8 below, a product yield of 61% was estimated even though the product contained a substantial amount of $(NH_4)_2V_6O_{16}$.

EXAMPLE 3

20.1 g $NH_4VO_3$ were added to about 850 ml deionized $H_2O$ and treated as in Comparative Example 1, except that 12 ml of concentrated HF in 30 ml deionized water were added to the boiling solution. The H/V ratio was 2/1.

After 1 hour, the beaker was removed from the heat and stirring discontinued. The solids settled quickly and were allowed to settle for 5 minutes. About 800 ml of supernatant liquid were decanted. The pH of the supernatant liquid, measured with multi-color strip pH paper, was about 3. The decanted supernatant liquid was pale yellow in color indicating the presence of some unprecipitated vanadium. About 900 ml of fresh $H_2O$ were added to the precipitate in the beaker, which was then slurried with the water by stirring for about one minute. The pH of the supernatant wash liquid was still about 3. The product was collected and dried as in Example 1 to give 8.6 grams of material. An X-ray powder diffraction pattern showed two peaks in the range $25.5°<2\theta<27°$ associated with $NH_{4(1-x)}V_3O_{8-y}F_z.nH_2O$, and also showed the presence of a very small amount of $(NH_4)_2V_6O_{16}$. On the basis of the former composition with x=y=z=0.1 and n=0.9, a product yield of 48% was calculated.

The resulting dried powder of $NH_{4(1-x)}V_3O_{8-y}F_z.nH_2O$ was then processed and combined as described in Example 1 to form an electrode 112 micrometers thick, which was incorporated into a coin cell as in Example 1, and the initial discharge capacity found to be 400 mAh/g.

EXAMPLE 4

20.1 g $NH_4VO_3$ were added to about 850 ml deionized $H_2O$ and treated as in Comparative Example 1, except that 15 ml of concentrated HF in 30 ml deionized water were added to the boiling solution. The H/V ratio was 2.5/1.

After 1 hour, the beaker was removed from the heat and stirring discontinued. The solids were allowed to settle for 5 minutes. About 800 ml of supernatant liquid were decanted. The pH of the supernatant liquid, measured with multi-color strip pH paper, was about 1–2. The decanted supernatant liquid was pale yellow in color indicating the presence of some unprecipitated vanadium. About 1000 ml of fresh deionized $H_2O$ were added to the precipitate in the beaker, which was then slurried with the water by stirring for about one minute. The pH of the supernatant wash liquid was about 2–3. The product was collected and dried as in Example 1 to give 6.6 grams of material. An X-ray powder diffraction pattern showed two peaks in the range $25.5°<2\theta<27°$ associated with $NH_{4(1-x)}V_3O_{8-y}F_z.nH_2O$, and also showed the presence of a very small amount of $(NH_4)_2V_6O_{16}$. On the basis of the $NH_{4(1-x)}V_3O_{8-y}F_z.nH_2O$ composition, a product yield of 38% was calculated.

The resulting dried powder of $NH_{4(1-x)}V_3O_{8-y}F_z.nH_2O$ was then processed and combined as described in Example 1 to form an electrode 120 micrometers thick, which was incorporated into a coin cell as in Example 1, and the initial discharge capacity found to be 395 mAh/g.

EXAMPLE 5

20.1 g $NH_4VO_3$ were added to about 850 ml deionized $H_2O$ and treated as in Comparative Example 1, except that 18 ml of concentrated HF in 30 ml deionized water were added to the boiling solution. The H/V ratio was 3/1.

After 1 hour, the beaker was removed from the heat and stirring discontinued. The solids were allowed to settle for 5 minutes. About 800 ml of supernatant liquid were decanted. The pH of the supernatant liquid, measured with multi-color strip pH paper, was about 1–2. The decanted supernatant liquid was yellow in color indicating the presence of unprecipitated vanadium. About 900 ml of fresh deionized $H_2O$ were added to the precipitate in the beaker, which was then slurried with the water by stirring for about one minute. The pH of the supernatant wash liquid was about 3. The product was collected and dried as in Example 1 to give 5.3 grams of material. An X-ray powder diffraction pattern showed two peaks in the range $25.5°<2\theta<27°$ associated with $NH_{4(1-x)}V_3O_{8-y}F_z.nH_2O$, and, also showed the presence of a very small amount of $(NH_4)_2V_6O_{16}$, and, of an amorphous impurity. On the basis of the $NH_{4(1-x)}V_3O_{8-y}F_z.nH_2O$ composition, a product yield of 30% was calculated.

The resulting dried powder of $NH_4V_3O_8.H_2O$ was then processed and combined as described in Example 1 to form an electrode 109 micrometers thick, which was incorporated into a coin cell as in Example 1, and the initial discharge capacity found to be 396 mAh/g.

COMPARATIVE EXAMPLE 2

20.1 g $NH_4VO_3$ were added to about 850 ml deionized $H_2O$ and treated as in Comparative Example 1, except that 24 ml of concentrated HF in 30 ml deionized water were added to the boiling solution. The H/V ratio was 4/1.

After 1 hour, the beaker was removed from the heat and stirring discontinued. No solid material was observed. On cooling, a small amount of brown solid formed. The pH of the supernatant liquid, measured with multi-color strip pH paper, was about 1–2. The product was collected by suction filtration and washed once with about 50 ml deionized water, then dried under an IR heat lamp to give 0.3 grams of material. An X-ray powder diffraction pattern showed the lines of $V_2O_5 \cdot H_2O$ and none of the desired $NH_{4(1-x)}V_3O_{8-y}F_z \cdot nH_2O$.

EXAMPLE 6

20.1 g $NH_4VO_3$ were added to about 850 ml deionized $H_2O$ while stirring with a Teflon coated magnetic stirring bar in a 1-liter Pyrex beaker. The contents of the beaker were heated to the boiling point to form a solution. After cooling the solution to room temperature, diluted HF, made by combining 13.5 ml of concentrated HF with 30 ml $H_2O$, was added to the stirring solution. The H/V ratio was 2.25/1. The reaction was stirred at room temperature for about 21 hours. A very small amount of solid formed during this time.

The contents of the beaker were heated to about 70° C. and stirred at this temperature for 6 hours, at which point the beaker was removed from the heat and stirring discontinued. The solids were allowed to settle for 10 minutes. About 800 ml of supernatant liquid were decanted. The pH of the supernatant liquid, measured with multi-color strip pH paper, was about 2–3. The decanted supernatant liquid was pale yellow in color indicating the presence of some unprecipitated vanadium. About 850 ml of fresh deionized $H_2O$ were added to the precipitate in the beaker, which was then slurried with the water by stirring for about one minute. The pH of the supernatant wash liquid was about 3. The product was collected and dried as in Example 1 to give 11.5 grams of material. An X-ray powder diffraction pattern showed the product to have two peaks in the 2θ range of 25.5–27° as shown in FIG. 1 for this sample. In comparison to the boiling temperature reactions described in the examples above, having H/V in the range 1.5–3, no $(NH_4)_2V_6O_{16}$ was seen in the XPD pattern of the 70° C. preparation. The composition $(NH_4)_{0.9}V_3O_{7.9}F_{0.1} \cdot 0.9H_2O$ was calculated from the results of thermogravimetric and chemical analyses. Nitrogen was determined by Keldahl titration, vanadium by inductively-coupled plasma (ICP), and fluorine by gravimetric-titrimetric reacton with $CeCl_3$. TGA was used to determine the amounts of $NH_3$ and $H_2O$.

An additional 2.1 g of solid was formed from the original decanted supernatant liquid after resting for 3 days at room temperature. An XPD pattern showed the solid to also be $NH_{4(1-x)}V_3O_{8-y}F_z \cdot nH_2O$ and free of $(NH_4)_2V_6O_{16}$ impurity. The composition $(NH_4)_{0.9}V_3O_{7.9}F_{0.2} \cdot 0.09H_2O$ was obtained from the results of chemical analyses.

A product yield of 76% was calculated on the total $NH_{4(1-x)}V_3O_{8-y}F_z \cdot nH_2O$ produced.

The resulting dried powder of $NH_{4(1-x)}V_3O_{8-y}F_z \cdot nH_2O$ from the first batch of product was then processed and combined as described in Example 1 to form an electrode 128 micrometers thick, which was incorporated into a coin cell as in Example 1, and the initial discharge capacity found to be 409 mAh/g. The first discharge-charge cycle is shown in FIG. 2.

EXAMPLE 7

20.1 g $NH_4VO_3$ was added to about 850 ml deionized $H_2O$ while stirring with a Teflon coated magnetic stirring bar in a 1 liter Pyrex beaker. The contents of the beaker were heated to the boiling point to form a solution, then cooled to about 90° C. 0.94 g of Super P carbon black commercially available from MMM S.A. Carbon, Brussels, Belgium was slurried in about 100 ml of deionized $H_2O$ by shaking, and the resulting slurry stirred into the 90° C. solution. The amount of added carbon black would give ~8% by weight of carbon in the product assuming a yield of 66% $NH_{4(1-x)}V_3O_{8-y}F_z \cdot nH_2O$.

When the temperature of the stirred slurry reached 70° C., 13.5 ml of concentrated HF, diluted in 30 ml deionized H2O, were added. The H/V ratio was 2.25. The resulting mixture was heated at about 70° C. while stirring for 8 hours. The beaker was then removed from the heat and stirred for 16 hours. Solids were collected by suction filtration. The pH of the yellow filtrate was about 3. The filter cake was vigorously reslurried with 800 ml fresh deionized water and stirred for 2 minutes. The washed product was collected and dried as in Example 1 to give 13.2 grams of material. An X-ray powder diffraction pattern showed two peaks in the range $25.5° < 2\theta < 27°$ associated with $NH_{4(1-x)}V_3O_{8-y}F_z \cdot nH_2O$ with no sign of contamination. Carbon black does not contribute lines to the XPD pattern.

To form an electrode, 1.0005 g of the dried and sieved powder was combined with 0.1008 g of MMM Super P carbon, 0.1557 g Kynarflex from Elf Atochem, 0.285 g dibutylpthalate, and 4.5 ml acetone. The mixture was shaken in a capped glass vial for 15 minutes on a mechanical shaker.

The cathode paste was spread onto a sheet of Teflon® FEP and drawn down to form a film using a doctor blade having a 20 mil gap. After acetone evaporation, the dibutylpthalate was extracted with dimethyl ether. The dried film, consisting of 79.6% by weight active powder, 12.4% by weight binder, and 8% by weight carbon black, was hot-pressed through calender rolls between Kapton® sheets at 2000 psi and 110° C. to form a consolidated sheet suitable for use as a cathode in a lithium battery. The thickness of the sheet was 139 micrometers.

A disk of the cathode sheet was cut with a punch and incorporated into a coin cell as described in Example 1. The initial discharge capacity was found to be 378 mAh/g. The first discharge-charge cycle is shown in FIG. 3.

EXAMPLE 8

10.05 g $NH_4VO_3$ were added to about 350 ml deionized $H_2O$ in a 500 ml beaker and treated as in Comparative Example 1, except that 6.4 ml of concentrated HF in 30 ml deionized water were added to the boiling solution. The H/V ratio was 2.2/1.

After 30 minutes, the beaker was removed from the heat, stirring was discontinued and the contents of the beaker cooled to about 50° C. About 300 ml of supernatant liquid were decanted. The pH of the supernatant liquid, measured with multi-color strip pH paper, was about 3. The decanted supernatant liquid was pale yellow in color indicating the presence of some unprecipitated vanadium. About 500 ml of fresh deionized H₂O were added to the precipitate in the beaker, which was then slurried with the water by stirring for about one minute. The pH of the supernatant wash liquid was about 3. The product was collected by suction filtration and the filter cake was broken up into pieces on a large cover glass and dried overnight in air at room temperature followed by heating under an IR heat lamp for 8 hours. 4.7 g of product were obtained. An X-ray powder diffraction pattern showed two peaks in the range 25.5°<2θ<27° associated with $NH_{4(1-x)}V_3O_{8-y}F_z \cdot nH_2O$, and also showed the presence of a very small amount of $(NH_4)_2V_6O_{16}$. The composition $(NH_4)_{1.0}V_3O_{7.9}F_{0.1} \cdot 0.9H_2O$ was calculated from the results of thermogravimetric and chemical analyses. On the basis of this composition, a product yield of 52% was calculated.

The resulting dried powder of $NH_{4(1-x)}V_3O_{8-y}F_z \cdot nH_2O$ was then processed and combined as described in Example 7 to form an electrode 131 micrometers thick, which was incorporated into a coin cell as in Example 1, and the initial discharge capacity found to be 412 mAh/g.

EXAMPLE 9

15.63 g V₂O₅ and 11.35 g KOH (85%) were mixed in about 850 ml deionized water while stirring with a Teflon coated magnetic stirring bar in a 1 liter Pyrex beaker. The contents of the beaker were heated to the boiling point to form a solution. 15 ml concentrated HF, diluted in 30 ml deionized water, were added to the boiling solution. The H/V ratio was 2.5/1.

After stirring at the boil for 70 minutes, the beaker was removed from the heat and stirring discontinued. The solids settled quickly and were allowed to settle for 5 minutes. About 800 ml of supernatant liquid were decanted. The pH of the supernatant liquid, measured with multi-color strip pH paper, was about 2–3. The decanted supernatant liquid was yellow in color indicating the presence of some unprecipitated vanadium. About 900 ml of fresh deionized H₂O were added to the precipitate in the beaker, which was then slurried with the water by stirring for about one minute. The pH of the supernatant wash liquid was about 3. The product was collected and dried as in Example 2 to give 6.3 grams of material. An X-ray powder diffraction pattern showed two peaks in the range 25.5°<2θ<27° associated with $K_{(1-x)}V_3O_{8-y}F_z \cdot nH_2O$. No impurity lines of $K_2V_6O_{16}$ were seen. A composition $K_{0.8}V_3O_{7.8}F_{0.2} \cdot 0.9H_2O$ was obtained from TGA and chemical analyses. On the basis of this composition, a product yield of 33% was calculated.

The resulting dried powder of $K_{(1-x)}V_3O_{8-y}F_z \cdot nH_2O$ was then processed and combined as described in Example 1 to form an electrode 133 micrometers thick, which was incorporated into a coin cell as in Example 1, and the initial discharge capacity found to be 186 mAh/g.

What is claimed is:

1. A composition comprising a hydrated trivanadate salt represented by the formula

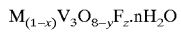

where M is $NH_4^+$ or $K^+$; 0≦x<0.5, 0<y<0.5, 0<z<0.5, and 0≦n<2.

2. The composition of claim 1 wherein M is $NH_4^+$.

3. The composition of claim 1 wherein 0≦x<0.3 and 0<y<0.3, and 0<z<0.3.

4. The composition of claim 1 wherein 0≦n<1.

5. The composition of claim 1 further characterized by having an x-ray powder diffraction pattern exhibiting at least one peak in the range of 25.5°<2θ<27.0° when copper is the source of the x-radiation.

6. The composition of claim 5 wherein the x-ray powder diffraction pattern exhibits two peaks in said range.

7. The composition of claim 1 further comprising a carbon substrate upon which said hydrated trivanadate salt resides.

8. An electrode comprising a composition as is any one of claims 1, 2, or 7.

9. An electrochemical cell comprising an anode and a cathode comprising the electrode of claim 8.

10. The electrochemical cell of claim 9 wherein the anode comprises an anode active material selected from the group consisting of lithium metal, lithium alloy and lithium-ion.

11. The electrochemical cell of claim 9 wherein the anode is a lithiated graphite.

12. A process for producing a hydrated trivanadate salt represented by the formula $M_{(1-x)}V_3O_{8-y}F_z \cdot nH_2O$ where M is $NH_4^+$ or $K^+$; 0≦x<0.5, 0<y<0.5, 0<z<0.5, and 0≦n<2, the process comprising combining a water-soluble vanadate salt with water to form a solution; and, adding to said solution hydrofluoric acid such that the molar ratio of acid protons to vanadium is in the range of 1.5:1 to 3:1.

13. The process of claim 12 further comprising the step of drying the hydrated trivanadate salt so formed.

14. The process of claim 12 further comprising heating the solution to a temperature between 65° C. and the boiling point, and adding the hydrofluoric acid while maintaining the temperature in that range.

15. The process of claim 14 wherein the temperature is in the range of 65° C.–75° C.

16. The process of claim 12 wherein the molar ratio of acid protons to vanadium is in the range of 2:1 to 3:1.

17. The process of claim 14 further comprising a reaction time of 4–24 hours.

18. The process of claim 12 further comprising slurrying carbon into the vanadate salt solution prior to the addition of the hydrofluoric acid.

19. A process for producing a hydrated trivanadate salt represented by the formula $M_{(1-x)}V_3O_{8-y}F_z \cdot nH_2O$ where M is $NH_4^+$ or $K^+$; 0≦x<0.5, 0<y<0.5, 0<z<0.5, and 0≦n<2, the process comprising combining a water-soluble vanadate salt with water to form a solution; and, adding to said solution hydrofluoric acid such that the molar ratio of acid protons to vanadium is in the range of 0.5:1 to 3:1.

20. The process of claim 19 further comprising the step of drying the hydrated trivanadate salt so formed.

21. The process of claim 19 wherein the molar ratio of acid protons to vanadium is in the range of 2:1 to 3:1.

* * * * *